US006514896B1

(12) United States Patent
Drake et al.

(10) Patent No.: US 6,514,896 B1
(45) Date of Patent: Feb. 4, 2003

(54) CATALYST COMPOSITION AND A PROCESS OF USING THEREOF

(75) Inventors: Charles A. Drake, Nowata, OK (US); An-hsiang Wu, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/478,570

(22) Filed: Jan. 6, 2000

Related U.S. Application Data

(62) Division of application No. 09/060,784, filed on Apr. 15, 1998, now Pat. No. 6,037,294.

(51) Int. Cl.[7] .......................... B01J 29/06; B01J 21/00; B01J 29/00; B01J 29/04; C07C 2/00
(52) U.S. Cl. .............................. 502/64; 502/71; 502/77; 502/85; 585/417; 585/420
(58) Field of Search ................ 502/64, 71, 77, 502/85; 585/417, 420

(56) References Cited

U.S. PATENT DOCUMENTS

| | | | | |
|---|---|---|---|---|
| 3,894,934 A | * | 7/1975 | Owen et al. | 208/78 |
| 4,347,395 A | * | 8/1982 | Chu et al. | 585/420 |
| 4,804,801 A | * | 2/1989 | Yan | 585/407 |
| 4,868,145 A | * | 9/1989 | Dessau et al. | 502/66 |
| 4,973,781 A | * | 11/1990 | Valyocsik et al. | 585/467 |
| 5,186,918 A | * | 2/1993 | Skeels et al. | 423/718 |
| 5,776,852 A | * | 7/1998 | Wu et al. | 502/177 |
| 5,804,059 A | * | 9/1998 | Wu et al. | 208/135 |
| 5,827,422 A | * | 10/1998 | Drake et al. | 208/135 |
| 5,866,741 A | * | 2/1999 | Wu et al. | 585/475 |
| 5,866,742 A | * | 2/1999 | Wu et al. | 585/475 |
| 5,866,744 A | * | 2/1999 | Wu et al. | 585/486 |
| 5,883,033 A | * | 3/1999 | Drake et al. | 502/68 |
| 5,883,034 A | * | 3/1999 | Drake et al. | 502/68 |

* cited by examiner

Primary Examiner—Stanley S. Silverman
Assistant Examiner—Cam N. Nguyen

(57) ABSTRACT

A process for making an improved zeolite catalyst composition comprising acid-treating a zeolite to provide an acid-treated zeolite, ion-exchanging the ions of such acid-treated zeolite with ions of zinc and at least one other metal in the presence of an ion-exchange medium, and then treating such acid-treated, ion-exchanged zeolite in a steam atmosphere. An improved zeolite catalyst composition made by such process is also disclosed. Processes are also disclosed for using the improved zeolite catalyst composition, made by the novel process, in the conversion of hydrocarbons, preferably non-aromatic hydrocarbons, to lower olefins (such as ethylene and propylene) and aromatic hydrocarbons (such as benzene, toluene, and xylene).

63 Claims, No Drawings

CATALYST COMPOSITION AND A PROCESS OF USING THEREOF

This application is a divisional of application Ser. No. 09/060,784 filed on Apr. 15, 1998, U.S. Pat. No. 6,037,294 issued Mar. 14, 2000.

BACKGROUND OF THE INVENTION

The invention relates to an improved process for converting hydrocarbons, preferably non-aromatic hydrocarbons, in the presence of an improved zeolite material, to aromatic hydrocarbons and lower olefin hydrocarbons preferably with a low rate of coke formation during the conversion of such hydrocarbons in the presence of such improved zeolite material.

It is known to catalytically crack gasoline boiling range hydrocarbons (in particular, non-aromatic gasoline boiling range hydrocarbons, more in particular, paraffins and olefins) to lower olefins (such as ethylene and propylene) and aromatic hydrocarbons (such as benzene, toluene, and xylene, and also ethylbenzene) in the presence of catalysts which contain a zeolite (such as ZSM-5), as is described in an article by N.Y. Chen et al. in Industrial & Engineering Chemistry Process Design and Development, Volume 25, 1986, pages 151–155. The reaction product of this catalytic cracking process contains a multitude of hydrocarbons such as unconverted $C_5+$ alkanes, lower alkanes (methane, ethane, propane), lower alkenes (ethylene and propylene), $C_6$–$C_8$ aromatic hydrocarbons (e.g., benzene, toluene, xylene, and ethylbenzene), and $C_9+$ aromatic hydrocarbons. Depending upon the relative market prices of the individual reaction products, it can be desirable to increase the yield of certain of the more valuable products relative to the others.

One concern with the use of zeolite catalysts in the conversion of hydrocarbons to aromatic hydrocarbons and lower olefins is the excessive production of coke during the conversion reaction. The term "coke" refers to a semi-pure carbon generally deposited on the metal surfaces of process equipment or a catalyst. Coke formed during the zeolite catalyzed aromatization of hydrocarbons tends to cause catalyst deactivation. It is desirable to improve processes for the aromatization of hydrocarbons, and the formation of lower olefins from hydrocarbons, by minimizing the amount of coke formed during such processes. It is also desirable to have a zeolite catalyst that is useful in producing significant quantities of the aromatic and olefin conversion products.

SUMMARY OF THE INVENTION

It is an object of this invention to provide a zeolite catalyst composition used to at least partially convert hydrocarbons to lower olefins (such as ethylene and propylene) and aromatic hydrocarbons (such as benzene, toluene, xylene and ethylbenzene, i.e., BTX).

A further object of this invention is to provide an improved process for the conversion of hydrocarbons in which the rate of coke formation during such conversion of hydrocarbons is minimized.

A yet further object of this invention is to provide an improved zeolite material which, when used in the conversion of hydrocarbons, results in less coke formation than alternative zeolite materials.

Another object of this invention is to provide an improved zeolite material that gives an improved yield of lower olefins when such improved zeolite material is utilized in the conversion of hydrocarbons.

Yet another object of this invention is to provide hydrocarbon conversion processes which have an acceptably low coke production rate and/or which produce a conversion product containing suitable quantities of lower olefins and BTX aromatics.

Yet another further object of this invention is to provide a method for making an improved zeolite material having such desirable properties as providing for low coke production and improved yields of lower olefins, with an especially improved ratio of lower olefins to aromatics in the product, when used in the conversion of hydrocarbons.

One embodiment of the invention is a novel process of making a zeolite catalyst composition used in the conversion of hydrocarbons, preferably non-aromatic hydrocarbons, to aromatic hydrocarbons and lower olefins. The novel process comprises ion-exchanging the original ions (specifically cations) such as, for example, alkali metal ions or alkaline earth metal ions, of a zeolite with hydrogen ions by acid-treating such zeolite. The cations, preferably hydrogen ions, of such acid-treated zeolite are then further ion-exchanged with ions of zinc and at least one other metal selected from the group of metals consisting of Group 6B of the periodic table of elements to thereby provide an acid-treated, ion-exchanged zeolite. The ion-exchange of such acid-treated zeolite occurs in the presence of an ion-exchange medium, preferably comprising an aqueous solution of an ammonium-containing compound, a zinc-containing compound, and a compound containing at least one other metal, which promotes the exchange of ions of the acid-treated zeolite with ions of zinc and at least one other metal. The acid-treated, ion-exchanged zeolite is then subjected to a steam treatment to provide the final improved zeolite catalyst composition.

Another embodiment of the invention is a process for the conversion of non-aromatic hydrocarbons to aromatic hydrocarbons and lower olefins by contacting, under conversion conditions, a hydrocarbon-containing fluid with an acid-treated, ion-exchanged, steam-treated zeolite catalyst composition.

Yet another embodiment of the invention is the novel composition of an acid-treated zeolite of which the ions of such zeolite have been ion-exchanged with ions of zinc and at least one other metal selected from the group of metals consisting of Group 6B of the periodic table of elements. The acid-treated, ion-exchanged zeolite is then subjected to a steam treatment to provide the final improved zeolite catalyst composition.

Yet another embodiment of the invention is the novel composition, i.e., product, made by the novel process of ion-exchanging the original ions (specifically cations) such as, for example, alkali metal ions or alkaline earth metal ions, of a zeolite with ions of hydrogen by acid-treating such zeolite. The cations, preferably hydrogen ions, of such acid-treated zeolite are then farther ion-exchanged with ions of zinc and at least one other metal from the group of metals consisting of Group 6B of the periodic table of elements. The ion-exchange of such acid-treated zeolite occurs in the presence of an ion-exchange medium, preferably comprising an aqueous solution of an ammonium-containing compound, a zinc-containing compound, and a compound containing at least one other metal, which promotes the exchange of ions of the acid-treated zeolite with ions of zinc and at least one other metal. The acid-treated, ion-exchanged zeolite is then subjected to a steam treatment to provide the final improved zeolite catalyst composition.

Other objects and advantages of the invention will become apparent from the detailed description and the appended claims.

DETAILED DESCRIPTION OF THE INVENTION

The inventive composition includes a zeolite starting material that has been ion-exchanged such that a predominant proportion of such zeolite's exchangeable ions (specifically cations) are hydrogen ($H^+$) ions. Preferably, such zeolite starting material has been treated with an acid to thereby provide an acid-treated zeolite in which a predominant proportion of such acid-treated zeolite's exchangeable ions (specifically cations) are hydrogen ($H^+$) ions. In general, it is contemplated that more than 50 percent and preferably more than 75 percent of the cationic sites of such acid-treated zeolite will be occupied by hydrogen ions. After further ion-exchange of such acid-treated zeolite, the resulting inventive composition further contains ions of zinc and at least one other metal or element selected from the group of elements consisting of Group 6B of the periodic table of elements. It is understood herein that any reference to at least one other metal in addition to zinc contained in the inventive composition will be an element from the Group 6B elements including Chromium (Cr), Molybdenum (Mo), and Tungsten (W). As the term is used within this description and in the claims, any reference to metals will include zinc and those Group 6B elements listed above.

An important aspect of the invention is the requirement that the original ions (specifically cations), such as, for example, alkali metal ions or alkaline earth metal ions, of a zeolite preferably be ion-exchanged with hydrogen ions ($H^+$) by acid-treating such zeolite to provide an acid-treated zeolite. While less preferred, the original ions of the zeolite may be ion-exchanged with hydrogen ions ($H^+$) via initial ammonium exchange followed by calcination.

The cations, preferably hydrogen ions, of such acid-treated zeolite are then dual ion-exchanged, i.e., simultaneously ion-exchanged with ions of zinc and at least one other metal in the presence of an ion-exchange medium, preferably comprising an aqueous solution of an ammonium-containing compound, a zinc-containing compound, and a compound containing at least one other metal, which promotes the exchange of ions of the acid-treated zeolite with ions of zinc and at least one other metal. The dual or simultaneous ion-exchange of such acid-treated zeolite in the presence of such ion-exchange medium creates an equilibrium (i.e., competitional) ion-exchange environment in which the ammonium ions ($NH_4^+$) of the ammonium-containing compound attempt to exchange with the cations, preferably hydrogen ions, of the acid-treated zeolite. However, the ammonium ions must "compete" with the ions of zinc and at least one other metal to ion-exchange (hence the term "competitional ion-exchange") with the cations of the acid-treated zeolite. The competitional ion-exchange environment allows for a better dispersion of the ions of zinc and at least one other metal within the acid-treated zeolite.

A yet farther important aspect of the novel process of making the catalyst is a steam-treating step. The steam-treating step includes a steam treatment of the acid-treated, ion-exchanged zeolite subsequent to such ion-exchange, as described above, of the original ions of a zeolite with ions of zinc and at least one other metal. The use of the steam-treatment step produces an acid-treated, ion-exchanged, steam-treated zeolite catalyst composition containing ions of zinc and at least one other metal that provides an improved lower olefin yield and an improved (i.e., greater) olefins-to-aromatics ratio when used in the conversion of hydrocarbons, preferably non-aromatic hydrocarbons, than a catalyst made by certain methods other than the inventive method described herein.

To make the improved zeolite catalyst having been ion-exchanged with ions of zinc and at least one other metal, a starting zeolite or zeolite material is, preferably, first treated with an acid to form an acid-treated zeolite in which the original ions (specifically cations) such as, for example, alkali metal ions or alkaline earth metal ions, of the starting zeolite or zeolite material are ion-exchanged with hydrogen ions ($H^+$). Methods known to one skilled in the art can be used to ion-exchange the zeolite starting material with hydrogen ions such as those disclosed in U.S. Pat. No. 5,516,956, the disclosure of which is incorporated herein by reference.

The zeolite starting material used in the composition of the invention can be any zeolite which is effective in the conversion of hydrocarbons, preferably non-aromatic hydrocarbons, to lower olefin hydrocarbons and aromatic hydrocarbons when contacted under suitable reaction conditions. Examples of suitable zeolites include, but are not limited to, those disclosed in Kirk-Othmer Encyclopedia of Chemical Technology, third edition, volume 15, pages 638–669 (John Wiley & Sons, New York, 1981). Preferably, the zeolite has a constraint index (as defined in U.S. Pat. No. 4,097,367, which is incorporated herein by reference) in the range of from about 0.4 to about 12, preferably in the range of from about 2 to about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is in the range of from about 8:1 to about 200:1, more preferably in the range of from about 12:1 to about 100:1. Preferred zeolites include ZSM-5, ZSM-8, ZSM-11, ZSM-12, ZSM-35, ZSM-38, and combinations thereof. Some of these zeolites are also known as "MFI" or "Pentasil" zeolites. The presently more preferred zeolite is ZSM-5.

To produce a zeolite in the hydrogen-exchanged form, the zeolite starting material is, preferably, treated with an acid by any suitable means or method(s) that result in an acid-treated zeolite. Generally, any organic acid, inorganic acid, or combinations thereof can be used in the process of the present invention so long as the acid provides a source of hydrogen ions for exchange with the original ions (specifically cations), such as, for example, alkali metal ions or alkali earth metal ions, of the zeolite. The acid can also be a diluted aqueous acid solution. Examples of possible acids include, but are not limited to, sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids wherein one or more protons have been replaced with, for example, a metal (preferably an alkali metal), and combinations thereof. Examples of partially neutralized acids include, but are not limited to, sodium bisulfate, sodium dihydrogen phosphate, potassium hydrogen tartarate, ammonium sulfate, ammonium chloride, ammonium nitrate, and combinations thereof. The presently preferred acid is aqueous hydrochloric acid.

Any method(s) known to one skilled in the art for treating a solid catalyst with an acid can be used in the acid treatment of the present invention. Generally, a zeolite material can be suspended in an acid solution. The concentration of the zeolite in the acid solution can be in the range of from about 0.01 gram per liter to about 500 grams per liter, preferably in the range of from about 0.1 gram per liter to about 400 grams per liter, more preferably in the range of from about 1 gram per liter to about 350 grams per liter, and most preferably in the range from 5 grams per liter to 300 grams per liter. The amount of acid required is the amount that can maintain the solution in acidic pH (i.e., pH less than about 7) during the treatment. Preferably, the initial pH of the acid solution containing a zeolite is adjusted to lower than about 6, preferably lower than about 5, more preferably lower than about 4, and most preferably lower than 3.

Upon the pH adjustment of the solution, the solution can be subjected to a treatment at a temperature in the range of from about 30° C. to about 200° C., preferably in the range of from about 50° C. to about 150° C., and most preferably in the range from 70° C. to 120° C. for a time period in the range of from about 1 minute to about 30 hours, preferably in the range of from about 5 minutes to about 25 hours, and most preferably in the range from 10 minutes to 20 hours. The treatment can be carried out under a pressure in the range of from about atmospheric to about 150 pounds per square inch absolute (psia), preferably about atmospheric, so long as the desired temperature can be maintained.

Thereafter, the acid-treated zeolite material can be washed with running water for a time period in the range of from about 1 minute to about 60 minutes followed by drying, at a temperature in the range of from about 50° C. to about 1000° C., preferably in the range of from about 75° C. to about 750° C., and most preferably in the range from 100° C. to 650° C. for a time period in the range of from about 0.5 hour to about 15 hours, preferably in the range of from about 1 hour to about 12 hours, and most preferably in the range from 1 hour to 10 hours, to produce an acid-treated zeolite. Any drying method(s) known to one skilled in the art such as, for example, air drying, heat drying, spray drying, fluidized bed drying, or combinations thereof can be used.

The dried, acid-treated zeolite can also be further washed, if desired, with a mild acid solution such as, for example, ammonium nitrate which is capable of maintaining the pH of the wash solution in acidic range (i.e., a pH of less than about 7). The volume of the acid generally can be the same volume as the acid for reducing the alumina content in a zeolite. The mild acid treatment can be carried out under substantially the same conditions as disclosed above for the preparation of an acid-treated zeolite. Thereafter, the resulting solid can be washed and dried as disclosed above.

The dried, acid-treated zeolite, whether it has been further washed with a mild acid or not, can be calcined, if desired, under conditions known to those skilled in the art. Generally, such conditions can include a temperature in the range of from about 250° C. to about 1,000° C., preferably in the range of from about 350° C. to about 750° C., and most preferably in the range from 450° C. to 650° C. and a pressure in the range of from about 7 pounds per square inch absolute (psia) to about 750 psia, preferably in the range of from about 7 psia to about 450 psia, and most preferably in the range from 7 psia to 150 psia for a time period in the range of from about 1 hour to about 30 hours, preferably in the range of from about 2 hours to about 20 hours, and most preferably in the range from 3 hours to 15 hours.

The acid-treated zeolite is then treated in an ion-exchange medium selected from the group consisting of water, organic solvents, and combinations thereof. Ion-exchange medium refers to any medium that permits the ion-exchange of such acid-treated zeolite. Typical organic solvents include alcohols, esters, ethers, ketones, and the like and combinations thereof. The preferred ion-exchange medium is water.

The ion-exchange medium, preferably water, further comprises an ammonium-containing compound, a zinc-containing compound and a compound containing at least one other metal. An ammonium-containing compound refers to a compound containing an exchangeable ammonium ion, for example $NH_4^+$. A zinc-containing compound refers to a compound containing an exchangeable zinc ion, for example $Zn^{+2}$. A compound containing at least one other metal refers to a compound containing an exchangeable ion of at least one other metal, for example $Cr^{+3}$. Preferably, the acid-treated zeolite is treated in an ion-exchange medium comprising an aqueous solution of an ammonium-containing compound, a zinc-containing compound, and a compound containing at least one other metal.

Examples of suitable ammonium-containing compounds include, but are not limited to, ammonium nitrate, ammonium sulfate, ammonium chloride, ammonium bromide, ammonium fluoride, and combinations thereof. The preferred ammonium-containing compound is ammonium nitrate. Treatment of the zeolite in an ion-exchange medium comprising an aqueous solution of an ammonium-containing compound, a zinc-containing compound, and a compound containing at least one other metal creates an environment in which the ammonium ions compete, with the ions of zinc and at least one other metal, to exchange with the cations, preferably hydrogen ions, of the acid-treated zeolite.

A novel, yet not fully understood, aspect of this invention is the reaction mechanism(s) in which the cations, preferably hydrogen ions, of the acid-treated zeolite are ion-exchanged with ions of zinc and at least one other metal. Wishing not to bound by any theory, one possible reaction mechanism is that the cations of the acid-treated zeolite may initially ion-exchange with ammonium ions of which such ammonium ions are further ion-exchanged with ions of zinc and at least one other metal. Another possible reaction mechanism is that the cations of the acid-treated zeolite may be simultaneously ion-exchanged with ions of ammonium, zinc, and at least one other metal. Yet another possible reaction mechanism is that the higher ion-binding forces of zinc and at least one other metal hinder the ammonium ions from exchanging with the cations of the acid-treated zeolite, allowing mostly ions of zinc and at least one other metal to exchange with the cations of the acid-treated zeolite. Any of these possible reaction mechanisms may be occurring and may even be occurring simultaneously.

Generally, an acid-treated zeolite can be suspended in a solution, preferably an aqueous solution, of an ammonium-containing compound, a zinc-containing compound, and a compound containing at least one other metal. The concentration of the acid-treated zeolite in such aqueous solution can be in the range of from about 0.01 gram of acid-treated zeolite per liter of aqueous solution (gm/L) to about 200 gm/L, preferably in the range of from about 0.1 gm/L to about 150 gm/L, more preferably in the range of from about 1 gm/L to about 100 gm/L, and most preferably in the range from 5 gm/L to 75 gm/L.

The amount of an ammonium-containing compound, a zinc-containing compound, and a compound containing at least one other metal in the aqueous solution depends on the amount of the original ion(s) to be exchanged. Generally, the concentration of an ammonium-containing compound in the aqueous solution can be in the range of from about 0.1 gram of ammonium-containing compound per liter of aqueous solution (gm/L) to about 500 gm/L, preferably in the range of from about 10 gm/L to about 400 gm/L, more preferably in the range of from about 20 gm/L to about 300 gm/L, and most preferably in the range from 50 gm/L to 200 gm/L.

Generally, the concentration of a zinc-containing compound in the aqueous solution can be in the range of from about 0.1 gram of zinc-containing compound per liter of aqueous solution (gm/L) to about 500 gm/L, preferably in the range of from about 1 gm/L to about 400 gm/L, more preferably in the range of from about 10 gm/L to about 300 gm/L, and most preferably in the range from 20 gm/L to 200 gm/L.

Generally, the concentration of a compound containing at least one other metal in the aqueous solution can be in the range of from about 0.1 gram of compound containing at least one other metal per liter of aqueous solution (gm/L) to about 500 gm/L, preferably in the range of from about 1 gm/L to about 400 gm/L, more preferably in the range of from about 10 gm/L to about 300 gm/L, and most preferably in the range from 20 gm/L to 200 gm/L.

Upon the preparation of an acid-treated zeolite suspended in a solution, preferably aqueous solution, of an ammonium-containing compound, a zinc-containing compound, and a compound containing at least one other metal, the solution can be subjected to a temperature in the range of from about 30° C. to about 200° C., preferably in the range of from about 40° C. to about 150° C., and most preferably in the range from 50° C. to 125° C. for a time period in the range of from about 1 hour to about 100 hours, preferably in the range of from about 1 hour to about 50 hours, and most preferably in the range from 2 hours to 25 hours, depending on desired degrees of ion exchange, and under a pressure in the range of from about atmospheric to about 150 pounds per square inch absolute (psia), preferably in the range of from about atmospheric to about 80 psia, or any pressure that can maintain the required temperature. Thereafter, the acid-treated, ion-exchanged zeolite can be washed with running water for a time period in the range of from about 1 minute to about 60 minutes followed by drying and calcining to produce an acid-treated, ion-exchanged, calcined zeolite. The drying and calcining processes can be carried out substantially the same as those disclosed above for the preparation of an acid-treated zeolite.

The acid-treated, ion-exchanged zeolite is then subjected to a steam treatment whereby it is exposed by any suitable means or method(s) known in the art to an atmosphere of steam under process conditions that suitably provide an acid-treated, ion-exchanged, steam-treated zeolite. The acid-treated, ion-exchanged zeolite is exposed to a predominantly gaseous atmosphere, preferably an entirely gaseous atmosphere, comprising steam. The steam atmosphere preferably has a concentration of steam exceeding about 90 molar percent and, most preferably, the concentration of the steam atmosphere exceeds about 95 molar percent.

The steam treatment may be conducted at any pressure and temperature conditions that suitably provide the acid-treated, ion-exchanged, steam-treated zeolite. Generally, the steam treatment may be conducted at a pressure in the range of from below atmospheric upwardly to about 1000 pounds per square inch absolute (psia). More typical pressures, however, are in the range of from about atmospheric to about 100 psia. The steam treatment temperature is generally in the range of from about 100° C. to about 1000° C. Preferably, this temperature is in the range of from about 101° C. to about 800° C. and, most preferably, the steam treatment temperature is in the range from 102° C. to 700° C.

The time period for conducting the steam treatment step must be sufficient to provide an acid-treated, ion-exchanged, steam-treated zeolite suitable for providing a zeolite catalyst composition having desired properties such as low coke formation and improved lower olefin yield. Generally, the time period for exposing the acid-treated, ion-exchanged zeolite to the atmosphere of steam at appropriate temperature conditions can be in the range of from about 0.1 hour to about 30 hours. Preferably, the steam treatment step is conducted for a time period in the range of from about 0.25 hour to about 25 hours and, most preferably, in the range from 0.5 hour to 20 hours.

Examples of a potentially suitable zinc-containing compound for use in ion-exchanging the ions of the acid-treated.zeolite with zinc ions include, but are not limited to, zinc nitrate, hydrated zinc nitrate, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc 2-ethylhexanoate, zinc fluoride, zinc fluoride tetrahydrate, zinc hexafluoro-acetylacetonate dihydrate, zinc iodide, zinc molybdate, zinc naphthenate, zinc nitrate hexahydrate, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof.

The preferred zinc-containing compound is zinc nitrate, more preferably hydrated zinc nitrate, and most preferably zinc nitrate hexahydrate as these zinc-containing compounds are readily available and effective for ion-exchange of the zinc ions of the zinc-containing compound with the ions of the acid-treated zeolite.

The at least one other metal for use in ion-exchange with the acid-treated zeolite can be any Group 6B metal-containing compound that can promote the ion-exchange of the metal ions of the metal-containing compound with the ions of the acid-treated zeolite.

Examples of suitable chromium-containing compounds include, but are not limited to, chromium(II) acetate, chromium(III) acetate, chromium(III) acetylacetonate, chromium(II) chloride, chromium(III) chloride, chromium (II) fluoride, chromium(III) fluoride, chromium(III) nitrate, hydrated chromium (III) nitrate, chromium (III) nitrate monohydrate chromium nitride, chromium(III) perchlorate, chromium(III) potassium sulfate, chromium(III) sulfate, chromium(III) telluride, and combinations thereof.

Examples of suitable molybdenum-containing compounds include, but are not limited to, molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum(IV) sulfide, sodium molybdate, potassium molybdate, molybdenum fluoride, and combinations thereof.

Examples of suitable tungsten-containing compounds include, but are not limited to, tungsten(V) bromide, tungsten(IV) chloride, tungsten(VI) chloride, tungsten(IV) sulfide, tungstic acid, and combinations thereof.

The preferred metal-containing compound is chromium (III) nitrate, more preferably hydrated chromium (III) nitrate, and most preferably chromium (III) nitrate nonahydrate as these metal-containing compounds are readily available and effective for ion-exchange of the chromium ions of the metal-containing compound with the ions of the acid-treated zeolite.

The amounts of zinc and at least one other metal ion-exchanged with the acid-treated zeolite should be such as to give concentrations, of such metals in the final improved zeolite catalyst composition, effective in providing the desirable properties of favorable (i.e., greater) olefin conversion yields, favorable (i.e., greater) olefins-to-aromatics ratio, and low coke production when the improved zeolite catalyst composition, as manufactured by the process described herein, is employed in the conversion of hydrocarbons, preferably non-aromatic hydrocarbons.

Generally, the amount of zinc and at least one other metal ion-exchanged with the acid-treated zeolite is such that the atomic ratio of the at least one other metal to zinc in the final improved zeolite catalyst composition is in the range of from about 0.1:1 to about 10:1. A preferred atomic ratio of the at least one other metal to zinc in the final improved zeolite catalyst composition is in the range of from about 0.2:1 to about 6:1 and, most preferably, the atomic ratio of the at least one other metal to zinc is in the range from 0.5:1 to 5:1.

Generally, the amount of zinc ion-exchanged with the acid-treated zeolite is such that the weight percent of zinc present in the final improved zeolite catalyst composition is generally in the range upwardly to about 10 weight percent of the total weight of the final improved zeolite catalyst composition. The preferred concentration of the zinc component in the final improved zeolite catalyst composition is in the range of from about 0.1 weight percent of the total weight of the final improved zeolite catalyst composition to about 10 weight percent of the total weight of the final improved zeolite catalyst composition and, most preferably, in the range from 0.5 weight percent of the total weight of the final improved zeolite catalyst composition to 5 weight percent of the total weight of the final improved zeolite catalyst composition.

Generally, the amount of the at least one other metal ion-exchanged with the acid-treated zeolite is such that the weight percent of the at least one other metal present in the final improved zeolite catalyst composition is generally in the range upwardly to about 10 weight percent of the total weight of the final improved zeolite catalyst composition. The preferred concentration of the at least one other metal in the final improved zeolite catalyst composition is in the range of from about 0.1 weight percent of the total weight of the final improved zeolite catalyst composition to about 10 weight percent of the total weight of the final improved zeolite catalyst composition and, most preferably, in the range from 0.5 weight percent of the total weight of the final improved zeolite catalyst composition to 5 weight percent of the total weight of the final improved zeolite catalyst composition.

The improved zeolite catalyst composition described herein can also contain an inorganic binder (also called matrix material) preferably selected from the group consisting of alumina, silica, alumina-silica, aluminum phosphate, clays (such as bentonite), and combinations thereof. The content of the zeolite component (e.g., acid-treated zeolite, acid-treated, ion-exchanged zeolite, or acid-treated, ion-exchanged, steam-treated zeolite) of the optional mixture, of zeolite component and inorganic binder, is in the range of from about 1 weight percent of the total weight of the optional mixture to about 99 weight percent of the total weight of the optional mixture. Preferably, the content of the zeolite component of the optional mixture is in the range of from about 5 weight percent of the total weight of the optional mixture to about 80 weight percent of the total weight of the optional mixture.

Any suitable means for mixing the zeolite component and binder can be used to achieve the desired dispersion of the materials in the resulting admixture. Many of the possible mixing means suitable for use in preparing the mixture of zeolite component and binder of the inventive method are described in detail in *Perry's Chemical Engineers' Handbook, Sixth Edition*, published by McGraw-Hill, Inc., copyright 1984, at pages 21-3 through 21-10, which pages are incorporated herein by reference. Thus, suitable mixing means can include, but are not limited to, such devices as tumblers, stationary shells or troughs, Muller mixers, which are either batch type or continuous type, impact mixers, and the like.

It can be desirable to form an agglomerate of the mixture of zeolite component and binder. Any suitable means known by those skilled in the art for forming such an agglomerate can be used. Such methods include, for example, molding, tableting, pressing, pelletizing, extruding, tumbling, and densifying. Further discussion of such methods is provided in a section entitled "Size Enlargement" in *Perry's Chemical Engineers' Handbook, Sixth Edition*, published by McGraw-Hill, Inc., copyright 1984, at pages 8–60 through 8–72, which pages are incorporated herein by reference.

Generally, the zeolite and inorganic binder components are compounded and subsequently shaped (such as by pelletizing, extruding or tableting) into a compounded composition. Generally, the surface area of the compounded composition is in the range of from about 50 $m^2/g$ to about 700 $m^2/g$. Generally, the particle size of the compounded composition is in the range of from about 1 mm to about 10 mm.

Any suitable hydrocarbon-containing fluid which comprises paraffins (alkanes) and/or olefins (alkenes) and/or naphthenes (cycloalkanes), wherein each of these hydrocarbons contains in the range of from about 2 carbon atoms per molecule to about 16 carbon atoms per molecule, can be used as the fluid to be contacted with the improved zeolite catalyst composition under suitable process conditions for obtaining a reaction product comprising lower olefins (alkenes, such as ethylene and propylene) containing in the range of from about 2 carbon atoms per molecule to about 5 carbon atoms per molecule and aromatic hydrocarbons (such as BTX, i.e., benzene, toluene, and xylene). Frequently, the suitable hydrocarbon-containing fluid also contains aromatic hydrocarbons. The term "fluid" is used herein to denote gas, liquid, vapor, or combinations thereof.

Non-limiting examples of suitable, available hydrocarbon-containing fluid include gasolines from catalytic oil cracking (e.g., FCC and hydrocracking) processes, pyrolysis gasolines from thermal hydrocarbon- (e.g., ethane, propane, and naphtha) cracking processes, naphthas, gas oils, reformates, straight-run gasoline and combinations thereof. Though the particular composition of the fluid is not critical, the preferred hydrocarbon-containing fluid is a gasoline-boiling range hydrocarbon-containing fluid suitable for use as at least a gasoline blend stock generally having a boiling range of about 30° C. to about 210° C. Generally, the content of paraffins exceeds the combined content of olefins, naphthenes and aromatics (if present).

The hydrocarbon-containing fluid can be contacted by any suitable means, method(s), or manner with the improved zeolite catalyst composition, described herein, contained within a reaction zone. i.e., conversion zone. The contacting step can be operated as a batch process step or, preferably, as a continuous process step. In the latter operation, a solid catalyst bed, or a moving catalyst bed, or a fluidized catalyst bed can be employed. Any of these operational modes have advantages and disadvantages, and those skilled in the art can select the one most suitable for a particular fluid and catalyst.

The contacting step is preferably carried out within a conversion zone, wherein is contained the improved zeolite catalyst composition, and under reaction conditions, i.e., conversion conditions, that suitably promote the formation of olefins, preferably lower olefins (i.e., light olefins such as ethylene and propylene), and aromatics, preferably BTX, from at least a portion of the hydrocarbons of the hydrocarbon-containing fluid. Thus, the reaction product, i.e., the conversion product, includes olefins and aromatics.

Reaction, or conversion, conditions would include a reaction temperature of the contacting step preferably in the range of from about 400° C. to about 800° C., more preferably in the range of from about 450° C. to about 750° C. and, most preferably in the range from 500° C. to 700° C. The contacting pressure can be in the range of from below atmospheric pressure upwardly to about 500 pounds per square inch absolute (psia), preferably, from about atmospheric to about 450 psia and, most preferably, from 20 psia to 400 psia.

The flow rate at which the hydrocarbon-containing fluid is charged (i.e., the charge rate of hydrocarbon-containing fluid) to the conversion zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon-containing fluid is charged to the conversion zone in pounds per hour divided by the pounds of catalyst contained in the conversion zone to which the hydrocarbon-containing fluid is charged. The preferred WHSV of the hydrocarbon-containing fluid to the conversion zone can be in the range of from about 0.25 hour$^{-1}$ to about 250 hour$^{-1}$ and, most preferably in the range from 0.5 hour$^{-1}$ to 100 hour$^{-1}$.

The process effluent from the conversion zone generally contains: a light gas fraction comprising hydrogen and methane, a $C_2$–$C_3$ fraction containing ethylene, propylene, ethane, and propane, an intermediate fraction including non-aromatic compounds having greater than 3 carbon atoms, a BTX aromatic hydrocarbons fraction (benzene, toluene, ortho-xylene, meta-xylene and para-xylene), and a $C_9$+ fraction which contains aromatic compounds having 9 or more carbon atoms per molecule.

Generally, the process effluent can be separated into these principal fractions by any known method(s) such as, for example, fractionation distillation. Because the separation method(s) are well known to one skilled in the art, the description of such separation method(s) is omitted herein. The intermediate fraction can be fed to an aromatization reactor to be converted to aromatic hydrocarbons. The methane, ethane, and propane can be used as fuel gas or as a feed for other reactions such as, for example, in a thermal cracking process to produce ethylene and propylene. The olefins can be recovered and further separated into individual olefins by any method(s) known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the improved zeolite catalyst composition has been deactivated by, for example, coke deposition or feed poisons, to an extent that the feed conversion and/or the selectivity to the desired ratios of olefins to BTX has become unsatisfactory, the improved zeolite catalyst composition can be reactivated by any means or method(s) known to one skilled in the art such as, for example, calcining in air to burn off deposited coke and other carbonaceous materials, such as oligomers or polymers, preferably at a temperature in the range of from about 400° C. to about 1000° C. The optimal time periods of the calcining depend generally on the types and amounts of deactivating deposits on the catalyst composition and on the calcination temperatures. These optimal time periods can easily be determined by those possessing ordinary skill(s) in the art and are omitted herein for the interest of brevity.

The following examples are presented to further illustrate this invention and are not to be construed as unduly limiting its scope.

EXAMPLE I

This example illustrates the preparation of several catalysts which were subsequently tested as catalysts in the conversion of a gasoline fluid sample to lower olefins (such as, ethylene and propylene) and aromatics (such as, BTX) as described in Example II.

Acid-Treated ZSM-5 Zeolite Catalyst

A commercially available ZSM-5 zeolite catalyst (provided by United Catalysts Inc., Louisville, Ky., under product designation "T-4480" obtained as $\frac{1}{16}$ inch extrudate) was treated with acid. To treat the catalyst with acid, the catalyst was soaked in an aqueous hydrochloric acid (HCl) solution, having a concentration of 19 weight percent HCl (approximately 6N), for two hours at a constant temperature of about 90° C. After soaking, the catalyst was separated from the acid solution and thoroughly washed with water and dried. The acid-soaked, washed, and dried catalyst was calcined at a temperature of about 525° C. for 4 hours.

Catalyst A (Control)

A 10.0 gram quantity of the above-described, acid-treated ZSM-5 zeolite catalyst (commercially available "T-4480" treated with acid, as described above) was impregnated, by an incipient wetness impregnation technique (i.e., essentially completely filling the pores of the substrate material with a solution of the incorporating elements), with a 12.5 gram quantity of an aqueous solution containing 12 weight percent of zinc nitrate hexahydrate ($Zn(NO_3)_2 \cdot 6H_2O$) and 32.8 weight percent of chromium (III) nitrate nonahydrate ($Cr(NO_3)_3 \cdot 9H_2O$). This acid-treated, impregnated zeolite was then dried in air at 125° C. for 16 hours. The thus dried, acid-treated, impregnated zeolite was then treated in a steam atmosphere for 6 hours at 650° C. with a $H_2O$ flow rate of 20 mL/hr. The thus steamed zeolite was than calcined in a helium atmosphere for 2 hours at 538° C. A final product weighing 11.01 grams was obtained. The final product contained a zinc (Zn) concentration of 2.995 percent of the total weight of the final product. The final product also contained a chromium (Cr) concentration of 4.836 percent of the total weight of the final product. The final product had an atomic ratio of chromium to zinc of 2.032:1.

Catalyst B (Invention)

A 10 gram quantity of above-described, acid-treated ZSM-5 zeolite catalyst (commercially available "T-4480"

treated with acid, as described above) was ion-exchanged, in a solution containing 0.50 grams of zinc nitrate hexahydrate (Zn(NO$_3$)$_2$·6H$_2$O), 1.35 grams of chromium (III) nitrate nonahydrate (Cr(NO$_3$)$_3$·9H$_2$O), 13.45 grams of ammonium nitrate (NH$_4$NO$_3$), and 150 grams of deionized water, at a constant temperature of 90° C. for 16 hours. The thus acid-treated, ion-exchanged zeolite was then washed with running water for about 30 minutes and then dried in air at room temperature (about 20° C. to about 25° C.) at atmospheric pressure (about 14.7 pounds per square inch absolute) for about 2 hours. The thus dried, acid-treated, ion-exchanged zeolite was then treated in a steam atmosphere for 6 hours at 650° C. with a H$_2$O flow rate of 20 mL/hr. A final product weighing 9.72 grams was obtained. The final product contained a zinc (Zn) concentration of 1.131 percent of the total weight of the final product. The final product also contained a chromium (Cr) concentration of 1.806 percent of the total weight of the final product. The final product had an atomic ratio of chromium to zinc of 2:1 and a ratio of ammonium ions (NH$_4^+$) to zinc ions (Zn$^{+2}$) of 100:1.

EXAMPLE II

This example illustrates the use of the catalysts described in Example I as catalysts in the conversion of a gasoline fluid to lower olefins (i.e., light olefins such as ethylene and propylene) and aromatics (such as, BTX). The gasoline fluid sample had been produced in a commercial fluidized catalytic cracking unit (FCC).

For each of the test runs, a 5.0 g sample, of the catalyst materials described in Example I sized to 10–20 mesh, was placed into a stainless steel tube reactor (length: about 18 inches; inner diameter: about 0.5 inch). Gasoline boiling range fluid from a catalytic cracking unit of a refinery was passed through the reactor at a flow rate of about 14 mL/hour, at a temperature of about 600° C., and at atmospheric pressure (about 0 pounds per square inch gauge). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Results of test runs for Catalyst A (Control) and Catalyst B (Invention) are summarized in Table I. All test data were obtained after 8 hours on stream.

TABLE I

| Catalyst | BTX Yield (wt - %) | Light Olefin* Yield (wt - %) | Sum of BTX and Olefin | Olefin/BTX Ratio | Avg wt - % Coke/hr** |
|---|---|---|---|---|---|
| A (Control) | 41 | 19.8 | 60.8 | 0.48 | 1.0 |
| B (Invention) | 31 | 24.3 | 55.3 | 0.78 | 0.7 |

*Ethylene and Propylene
**Coke was determined at the end of the reaction by removing the catalysts from the reactor and measuring the coke with a thermal gravimetric analyzer (TGA), manufactured by TA Instruments; New Castle, Delaware.

The test data presented in Table I clearly show that Invention Catalyst B exhibited considerably less coking than Control Catalyst A. Invention Catalyst B also exhibited a remarkably improved (i.e., greater) Olefin/BTX ratio when compared to Control Catalyst A. The performance of Invention Catalyst B, as compared to Control Catalyst A, is superior when comparing the light olefin yield and Olefin/BTX ratio. The improvement in catalyst performance is believed to be due to the novel process of making the invention catalyst by the novel process of a dual ion-exchange of the ions of an acid-treated zeolite with ions of zinc and at least one other metal followed by a steam treatment of such acid-treated, ion-exchanged zeolite.

The difference in performance between the invention catalyst and the control catalyst is certainly unexpected. One would not expect that dual ion-exchange of an acid-treated zeolite by soaking such acid-treated zeolite in a solution of, for example, zinc nitrate hexahydrate, chromium (III) nitrate nonahydrate, and ammonium nitrate, followed by steam treatment, in lieu of incipient wetness impregnating the acid-treated zeolite with a solution of zinc nitrate hexahydrate and chromium (III) nitrate nonahydrate followed by steam treatment, would enhance the performance of the final zeolite catalyst composition. The results demonstrate that Invention Catalyst B, in which the acid-treated zeolite is ion-exchanged and steam-treated, as opposed to impregnated and steam-treated, gives a catalyst that is significantly superior to Control Catalyst A.

The results shown in the above example clearly demonstrate that the present invention is well adapted to carry out the objects and attain the ends and advantages mentioned as well as those inherent therein. Reasonable variations, modifications, and adaptations can be made within the scope of the disclosure and the appended claims without departing from the scope of this invention.

What is claimed is:

1. A composition prepared by a process consisting essentially of:
    (a) treating a zeolite with an acid to form an acid-treated zeolite,
    (b) ion-exchanging said acid-treated zeolite with zinc and at least one other metal selected from the group consisting of Group 6B elements of the periodic table of elements to form an acid-treated, ion-exchanged zeolite, and
    (c) steam treating said acid-treated, ion-exchanged zeolite to form an acid-treated, ion exchanged, steam-treated zeolite, wherein the amount of said zinc and said tar least one other metal ion-exchanged with said acid-treared zeolite is to provide an atomic ratio of said at least one other metal to said zinc in said catalyst in the range of from about 0.1:1 to about 10:1.

2. A composition according to claim 1 wherein the amount of said zinc ion-exchanged with said acid-treated zeolite is to provide a concentration of said zinc in said catalyst in the range of from about 0.1 to about 10 weight percent of the total weight of said catatlyst.

3. A composition according to claim 2 wherein the amount of said at least one other metal ion-exchanged with said acid-treated zeolite is to provide a concentration of said at least one other metal in said catalyst in the range of from about 0.1 to about 10 weight percent of the total weight of said catalyst.

4. A composition according to claim 3 wherein said ion-exchanging step (b) futher comprises ion-exchanging said acid-treated zeolite in an ion-exchange medium.

5. A composition according to claim 4 wherein said ion-exchanging medium is selected from the group consisting of water, organic solvents, and combinations thereof.

6. A composition according to claim 5 wherein said ion-exchange medium is water.

7. A composition according to claim 6 wherein said ion-exchange medium further comprises an ammonium-containing compound, a zinc-containing compound and a compound containing said at least one other metal.

8. A composition according to claim 4 wherein said ion-exchange medium comprises an aqueous solution of an ammonium-containing compound, a zinc-containing compound and a compound containing said at least one other metal.

9. A composition according to claim 8 wherein said ammonium-containing compound is selected from the group consisting of ammonium nitrate, ammonium sulfate, ammonium chloride, ammonium bromide, ammonium fluoride, and combinations thereof.

10. A composition according to claim 9 wherein said ammonium-containing compound is ammonium nitrate.

11. A composition according to claim 8 wherein said zinc-containing compound is selected from the group consisting of zinc nitrate, hydrated zinc nitrate, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc perchlorate hexahydrate, zinc phosphate hydrate, zinc phthalocynine, zinc protoporphyrin, zinc selenide zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof.

12. A composition according to claim 11 wherein said zinc-containing compound is zinc nitrate hexahydrate.

13. A composition according to claim 8 wherein said compound containing said at least one other metal is a compound selected from the group consisting of chromium-containing compounds, molybdenum-containing compounds, and tungsten-containing compounds.

14. A composition according to claim 13 wherein said chromium-containing compound is selected from the group consisting of chromium(II) acetate, chromium(III) acetate, chromium(III) acetylacetonate, chromium(II) chloride, chromium(III) chloride, chromium(II) fluoride, chromium(III) fluoride, chromium(III) nitrate, hydrated chromium(III) nitrate, chromium(III) nitrate nonahydrate, chromium nitride, chromium(III) perchlorate, chromium(III) potassium sulfate, chromium(III) sulfate, chromium(III) telluride, and combinations thereof.

15. A composition according to claim 13 wherein said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum(IV) sulfide, sodium molybdate potassium molybdate, molybdenum fluoride, and combinations thereof.

16. A composition according to claim 13 wherein said tungsten-containing compound is selected from the group consisting of tungsten(V) bromide, tungsten(IV) chloride, tungsten(VI) chloride, tungsten(IV) sulfide, tungstic acid, and combinations thereof.

17. A composition according to claim 8 wherein said compound containing at least one other metal is chromium (III) nitrate nonahydrate.

18. A composition according to claim 8 wherein the concentration of said acid-treated zeolite in said solution is in the range of from about 0.01 to about 200 grams of said acid-treared zeolite per liter of said solution.

19. A composition according to claim 8 wherein the concentration of said ammonium-containing compound in said solution is in the range of from about 0.1 to about 500 grams of said ammonium-containing, compound per liter of said solution.

20. A composition according to claim 8 wherein the concentration of said zinc-containing compound in said solution is in the range of from about 0.1 to about 500 grams of said zinc-containing compound per liter of said solution.

21. A composition according to claim 8 wherein the concentration of said compound containing said at least one other metal in said solution is in the range of from about 0.1 to about 500 grams of said compound containing said at least one other metal per liter of said solution.

22. A composition according to claim 8 wherein said solution can be subjected to a temperature in the range of from about 30° C. to about 200° C., for a time period in the range of from about 1 hour to about 100 hours, and under a pressure in the range of from about atmospheric to about 150 pounds per square inch absolute.

23. A composition according to claim 1 wherein said treating step (a) comprises contacting said zeolite with said acid selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids and combinations thereof.

24. A composition according to claim 23 wherein said acid is hydrochloric acid.

25. A composition according to claim 1 wherein said zeolite is selected from the group consisting of ZSM-5, ZSM-8, ZSM-11, ZSM-12, ZSM-35, ZSM-38, and combinations thereof.

26. A composition according to claim 25 wherein said zeolite is ZSM-5.

27. A composition according to claim 1 wherein said steam treating step (c) comprises exposing said acid-treated, ion-exchanged zeolite to a steam atmosphere having a concentration of steam exceeding about 90 molar percent a pressure in the range of from about atmospheric to about 1000 pounds per square inch absolute, a temperature in the range of from about 1000° C. to about 1000° C. and a time period in the range of from about 0.1 hour to about 30 hours.

28. A process comprising contacting, under reaction conditions, a hydrocarbon-containing fluid with a composition, wherein a reaction product includes olefins and aromatics, and further wherein said composition is prepared by a process consisting essentially of:

(a) treating a zeolite with an acid to form an acid-treated zeolite, (b) ion-exchanging said acid-treated zeolite with zinc and at least one other metal selected from the group consisting of Group 6B elements of the periodic table of the elements to form an acid-treated, ion-exchanged zeolite, and (c) steam treating said acid-treated, ion-exchanged zeolite to form an acid-treated, ion-exchanged, steam-treated zeolite, wherein the amount of said zinc and said At least one other metal ion-exchanged with said acid-treated zeolite is to provide an atomic ratio of said at least one other metal to said zinc in said catalyst in the range of from about 0.1:1 to about 10:1.

29. A process according to claim 28 wherein the amount of said zinc ion-exchanged with said acid-treated zeolite is to provide a concentration of said zinc in said catalyst in the range of from about 0.1 to about 10 weight percent of the total weight of said catalyst.

30. A process according to claim 29 wherein the amount of said at least one other metal ion-exchanged with said acid-treated zeolite is to provide a concentration of said at least one other metal in said catalyst in the range of from about 0.1 to about 10 weight percent of the total weight of said catalyst.

31. A process according to claim 30 wherein said ion-exchanging step (b) further comprises ion-exchanging said acid-treated zeolite in an ion-exchange medium.

32. A process according to claim 31 wherein said ion-exchange medium is selected from the group consisting of water, organic solvents, and combinations thereof.

33. A process according to claim 32 wherein said ion-exchange medium is water.

34. A process according to claim 33 wherein said ion-exchange medium further comprises an ammonium-containing compound, a zinc-containing compound and a compound containing said at least one other metal.

35. A process according to claim 31 wherein said ion-exchange medium comprises an aqueous solution of an ammonium-containing compound, a zinc-containing compound and a compound containing said at least one other metal.

36. A process according to claim 35 wherein said ammonium-containing compound is selected from the group consisting of ammonium nitrate, ammonium sulfate, ammonium chloride, ammonium bromide, ammonium fluoride, and combinations thereof.

37. A process according to claim 36 wherein said ammonium-containing compound is ammonium nitrate.

38. A process according to claim 35 wherein said zinc-containing compound is selected from the group consisting of zinc nitrate, hydrated zinc nitrate, zinc acetate dehydrate, zinc acetylacetonate hydrate, zinc bromide, zinc carbonate hydroxide, zinc chloride, zinc cyclohexanebutyrate dihydrate, zinc 2-ethylhexanoate, zinc fluoride, zinc fluoride tetrahydrate, zinc hexafluoroacetylacetonate dihydrate, zinc iodide, zinc molybdate, zinc naphthenate, zinc nitrate hexahydrate, zinc perchlorate hexahydrate, zinc phosphate hydrate, zinc phthalocynine, zinc protoporphyrin, zinc selenide, zinc sulfate monohydrate, zinc sulfide, zinc telluride, zinc tetrafluoroborate hydrate, zinc meso-tetraphenylprophine, zinc titanate, zinc trifluoromethanesulfonate, and combinations thereof.

39. A process according to claim 38 wherein said zinc-containing compound is zinc nitrate hexahydrate.

40. A process according to claim 35 wherein said compound containing said at least one other metal is a compound selected from the group consisting of chromium-containing compounds, molybdenum-containing compounds, and tungsten-containing compounds.

41. A process according to claim 40 wherein said chromium-containing compound is selected from the group consisting of chromium(II) acetate, chromium(III) acetate, chromium(III) acetylacetonate, chromium(II) chloride, chromium(III) chloride, chromium(II) fluoride, chromium (III) fluoride, chromium(III) nitrate, hydrated chromium (III) nitrate, chromium (III) nitrate nonahydrate, chromium nitride, chromium(III) perchlorate, chromium(III) potassium sulfate, chromium(III) sulfate, chromium(III) telluride, and combinations thereof.

42. A process according to claim 40 wherein said molybdenum-containing compound is selected from the group consisting of molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum(IV) sulfide, sodium molybdate, potassium molybdate, molybdenum fluoride, and combinations thereof.

43. A process according to claim 40 wherein said tungsten-containing compound is selected from the group consisting of tungsten(V) bromide, tungsten(IV) chloride, tungsten(VI) chloride, tungsten(IV) sulfide, tungstic acid, and combinations thereof.

44. A process according to claim 35 wherein said compound containing at least one other metal is chromium (III) nitrate nonahydrate.

45. A process according to claim 35 wherein the concentration of said acid-treated zeolite in said solution is in the range of from about 0.01 gram to about 200 grams of said acid-treated zeolite per liter of said solution.

46. A process according to claim 35 wherein the concentration of said ammornium-containing compound in said solution is in the range of from about 0.1 gram to about 500 grams of said ammonium-containing compound per liter of said solution.

47. A process according to claim 35 wherein the concentration of said zinc-containing compound in said solution is in the range of from about 0.1 gram to about 500 grams of said zinc-containing compound per liter of said solution.

48. A process according to claim 35 wherein the concentration of said compound containing said at feast one other metal in said solution is in the range of from about 0.1 gram to about 500 grams of said compound containing said at least one other metal per liter of said solution.

49. A process according to claim 35 wherein said solution can be subjected to a temperature in the range of from about 30° C. to about 200° C., for a time period in the range of from about 1 hour to about 100 hours, and under a pressure in the range of from about atmospheric to about 150 pound per square inch absolute.

50. A process according to claim 28 wherein said treating step (a) comprises contacting said zeolite with said acid selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids and combinations thereof.

51. A process according to claim 50 wherein said acid is hydrochloric acid.

52. A process according to claim 28 wherein said zeolite is selected from the group consisting of ZSM-5, ZSM-8, ZSM-11, ZSM-12, ZSM-35, ZSM-38, and combinations thereof.

53. A process according to claim 52 wherein said zeolite is ZSM-5.

54. A process according to claim 28 wherein said steam treating step (c) comprises exposing said acid-treated, ion-exchanged zeolite to a steam atmosphere having a concentration of steam exceeding about 90 molar percent,
   a pressure in the range of from about atmospheric to about 1000 pounds per square inch absolute,
   a temperature in the range of from about 100° C. to about 1000° C. and
   a time period in the range of from about 0.1 hour to about 30 hours.

55. A process according to claim 28, wherein said hydrocarbon-containing fluid is selected from the group consisting of gasolines from catalytic oil cracking processes, pyrolysis gasolines from thermal hydrocarbon-cracking processes, naphthas, gas oils, reformates, straight-run gasoline and combinations thereof.

56. A process according to claim 28, wherein a hydrocarbon of said hydrocarbon-containing fluid contains in the range of from about 2 to about 16 carbon atoms per molecule.

57. A process according to claim 28, wherein said reaction conditions comprise:
- a temperature in the range of from about 400° C. to about 800° C.,
- a pressure in the range of from below atmospheric pressure upwardly to about 500 pounds per square inch absolute, and
- a charge rate of said hydrocarbon-containing fluid such that the weight hourly space velocity is in the range of from exceeding 0 hour$^{-1}$ upwardly to about 1000 hour$^{-1}$.

58. A composition for use in converting hydrocarbons, said composition consists essentially of an acid-treated zeolite ion-exchanged with zinc and at least one other met selected from the group consisting of Group 6B of the periodic table of elements to thereby form an acid-treated, ion-exchanged zeolite wherein said acid-treated, ion-exchanged zeolite is steam-treated, wherein the amounts of said zinc and said at least one other metal that are ion-exchanged with said acid-treated zeolite are such that the atomic ratio of said at least one other metal to said zinc ion in said composition is in the range of from about 0.1.1 to about 10:1.

59. A composition according to claim 58, wherein the amount of said zinc in said composition is in the range of from about 0.1 weight percent to about 10 weight percent of the total weight of said composition.

60. A composition according to claim 59, wherein the amount of said at least one other metal in said composition is in the range of from about 0.1 weight percent to about 10 weight percent of the total weight of said composition.

61. A composition according to claim 60, wherein said at least one other metal is chromium.

62. A composition according to claim 61, wherein said zeolite is selected from the group consisting of ZSM-5, ZSM-8, ZSM-11, ZSM-12, ZSM-35, ZSM-38, and combinations thereof.

63. A composition according to claim 62, wherein said zeolite is ZSM-5.

* * * * *